United States Patent
Philpott et al.

(10) Patent No.: US 10,400,837 B2
(45) Date of Patent: Sep. 3, 2019

(54) BRAKE CARRIER AND METHOD OF MANUFACTURE

(71) Applicant: ArvinMeritor Technology, LLC, Troy, MI (US)

(72) Inventors: Daniel Philpott, Oxford, MI (US); Soumar Jabbour, Sterling Heights, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 15/730,193

(22) Filed: Oct. 11, 2017

(65) Prior Publication Data

US 2019/0107159 A1    Apr. 11, 2019

(51) Int. Cl.
*F16D 65/00* (2006.01)

(52) U.S. Cl.
CPC .... *F16D 65/0068* (2013.01); *F16D 2250/003* (2013.01); *F16D 2250/0007* (2013.01)

(58) Field of Classification Search
CPC ........... B22C 9/22; B22C 9/101; B22C 9/108; F16D 2055/0016; F16D 2250/003; F16D 2250/0007; F16D 2250/0015; F16D 65/0068; F16D 65/18; F16D 2200/003; B22D 17/24; B22D 25/02
USPC ... 188/73.31, 73.45, 73.37, 248, 378, 218 R, 188/251 A, 251 M, 250 B, 250 E, 250 H, 188/71.1; 164/349, 365, 47, 137, 164/358–359, 100, 75
See application file for complete search history.

(56) References Cited

U.S. PATENT DOCUMENTS

| | | | |
|---|---|---|---|
| 6,068,610 A | 5/2000 | Ellis et al. | |
| 6,345,701 B1 | 2/2002 | Di Ponio | |
| 8,857,575 B2 | 10/2014 | Philpott | |
| 9,222,532 B2 | 12/2015 | Thomas et al. | |
| 9,279,468 B1 | 3/2016 | Philpott | |
| 2004/0060781 A1* | 4/2004 | Goebel | B22C 9/22 188/73.31 |
| 2007/0056815 A1 | 3/2007 | Hanna et al. | |
| 2010/0147639 A1* | 6/2010 | Roberts | F16D 55/226 188/242 |
| 2015/0159712 A1* | 6/2015 | Yasuda | F16D 65/18 188/72.2 |
| 2016/0146279 A1 | 5/2016 | Philpott | |

(Continued)

FOREIGN PATENT DOCUMENTS

| | | |
|---|---|---|
| GB | 139817 A | 10/1920 |
| WO | 2017060513 A1 | 4/2017 |

OTHER PUBLICATIONS

Partial European Search Report for European Patent Application No. EP18192585, dated Mar. 12, 2019, 15 pgs.

(Continued)

*Primary Examiner* — Robert A. Siconolfi
*Assistant Examiner* — San M Aung
(74) *Attorney, Agent, or Firm* — Brooks Kushman P.C.

(57) ABSTRACT

A brake carrier and a method of manufacture. The brake carrier may have leading and trailing brake pad abutments. The leading brake pad abutment may have an unmachined leading wall surface and an unmachined leading floor surface. The trailing brake pad abutment may have a trailing wall surface and a trailing floor surface, at least one of which may be machined.

17 Claims, 3 Drawing Sheets

(56) References Cited

U.S. PATENT DOCUMENTS

| | | |
|---|---|---|
| 2016/0199904 A1* | 7/2016 | Arai .................. B22C 9/06 |
| | | 188/73.31 |
| 2016/0215834 A1 | 7/2016 | Knoop et al. |
| 2016/0356329 A1 | 12/2016 | Corcoran et al. |
| 2017/0082160 A1 | 3/2017 | Philpott et al. |
| 2017/0138427 A1 | 5/2017 | Schoenauer et al. |

OTHER PUBLICATIONS

European Patent Office, Extended European Search Report for corresponding European Application No. 18192585.0-1012, dated May 8, 2019.

* cited by examiner

BRAKE CARRIER AND METHOD OF MANUFACTURE

TECHNICAL FIELD

This disclosure relates to a brake carrier and a method of manufacture.

BACKGROUND

A brake carrier is disclosed in U.S. Pat. No. 9,222,532.

SUMMARY

In at least one approach, a unitary cast brake carrier is provided. The unitary cast brake carrier may include a leading brake pad abutment defining a leading horizontal surface, and a leading vertical surface extending generally orthogonal to the leading horizontal surface. The leading vertical surface may be unmachined. The unitary cast brake carrier may further include a trailing brake pad abutment disposed opposite the leading brake pad abutment to receive a brake pad assembly between the leading brake pad abutment and the trailing brake pad abutment. The trailing brake pad abutment may define a trailing horizontal surface and a trailing vertical surface extending generally orthogonal to the trailing horizontal surface. The trailing vertical surface may be machined and may have a surface roughness value less than a surface roughness value of the leading vertical surface.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
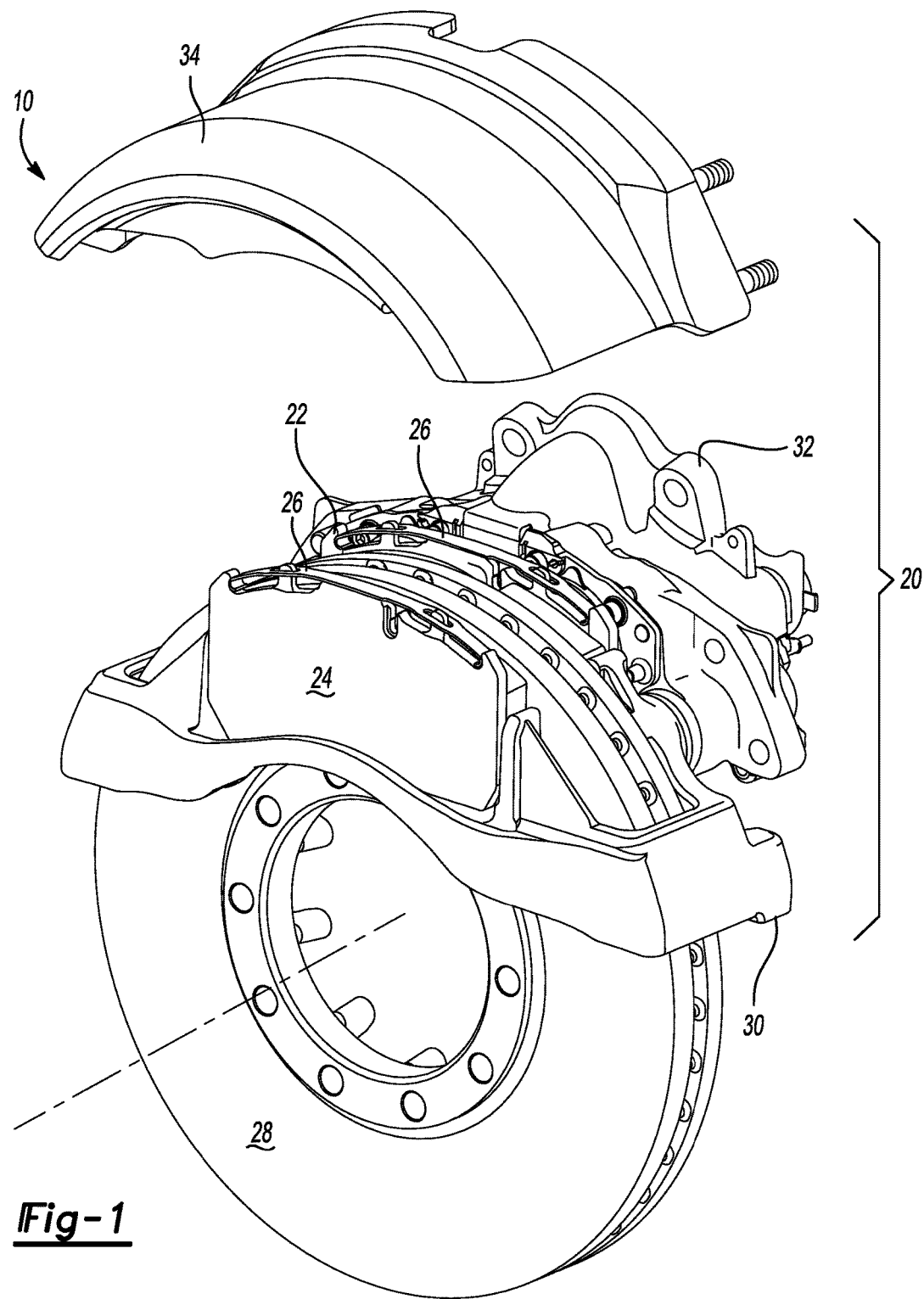
FIG. 1 is a partially exploded view of a brake assembly.

Referring to FIG. 1, a brake assembly 10 is shown. The brake assembly 10 may be provided with a vehicle, such as a motor vehicle like a truck, bus, farm equipment, military transport or weaponry vehicle, or cargo loading equipment for land, air, or marine vessels. In at least one approach, the brake assembly 10 may include a housing assembly 20, a first brake pad assembly 22, a second brake pad assembly 24, and at least one brake pad spring 26.

The housing assembly 20 may receive various components of the brake assembly 10. In addition, the housing assembly 20 may facilitate positioning of the first brake pad assembly 22 and the second brake pad assembly 24 with respect to a rotor 28, also known as a brake disc, to facilitate braking of the vehicle. In at least one approach, the housing assembly 20 may include a brake carrier 30, a housing 32, and a bridge 34.

The brake carrier 30 may be fixedly mounted to the vehicle. For example, the brake carrier 30 may be connected to an axle assembly or a steering knuckle, such as with an intermediate component like a torque plate in one or more embodiments. The brake carrier 30 may receive and/or support the first brake pad assembly 22 and the second brake pad assembly 24, and may include a rotor opening that may be configured to receive the rotor 28. As such, the brake carrier 30 may straddle the rotor 28 and help position the first brake pad assembly 22 and the second brake pad assembly 24 on opposite sides of the rotor 28.

The housing 32 may be moveably disposed on the brake carrier 30. For example, the housing 32 may be slidably disposed on a pair of guide pins that may be fixedly disposed on the brake carrier 30. The housing 32 may be associated with or may receive at least one actuator that may actuate the first brake pad assembly 22 and the second brake pad assembly 24 into engagement with the rotor 28. More specifically, the actuator may actuate the first brake pad assembly 22 into engagement with the rotor 28 and then move the housing 32 and bridge 34 to actuate the second brake pad assembly 24 toward the rotor 28. The actuator may have any suitable configuration. For instance, the actuator may include a piston assembly that may be pneumatically, hydraulically, mechanically, electrically, or electromechanically actuated in one or more embodiments. The piston assembly may move along an axis toward or away from the rotor 28 such that the piston assembly may exert force against a back side of the first brake pad assembly 22.

Figure 2:
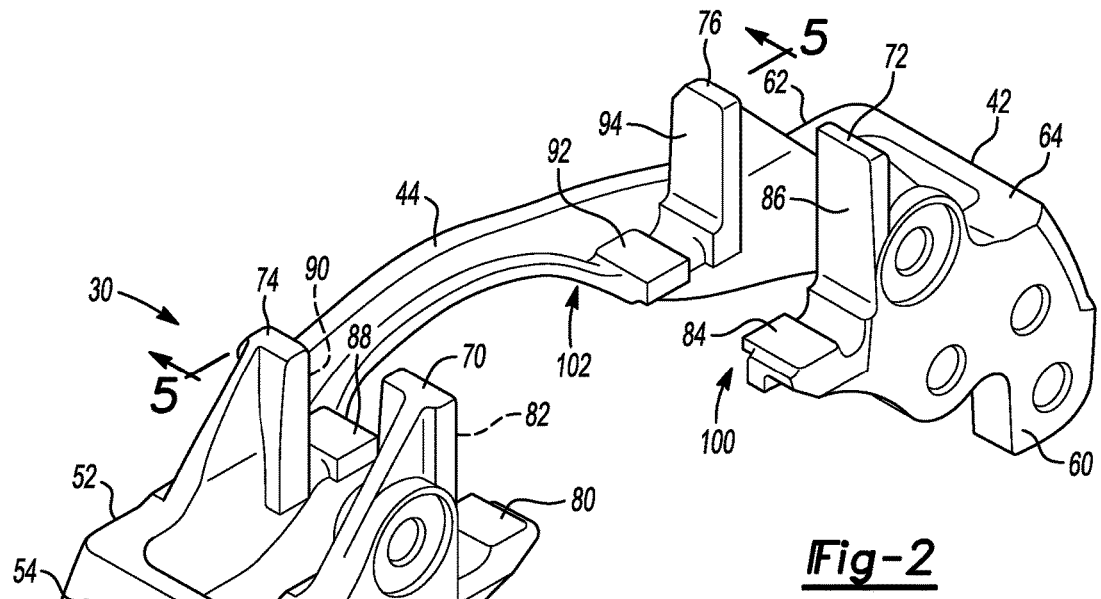
FIG. 2 is a perspective view of a brake carrier that may be provided with the brake assembly.

Referring to FIG. 2, the brake carrier 30 may be a unitary ("one-piece") cast brake carrier 30. The brake carrier 30 may define a leading portion 40, a trailing portion 42, and a bridge 44 extending between the leading portion 40 and the trailing portion 42. As used herein, the leading portion 40 of the brake carrier 30 may be the portion that the rotor 28 rotates "into" when the vehicle is moving in the forward direction, and the trailing portion 42 may be the portion that the rotor 28 rotates "away from" when the vehicle is moving in the forward direction.

The leading portion 40 may define a leading inboard portion 50, a leading outboard portion 52, and a leading arm 54 extending between the leading inboard portion 50 and the leading outboard portion 52.

The trailing portion 42 may define a trailing inboard portion 60, a trailing outboard portion 62, and a trailing arm 64 extending between the trailing inboard portion 60 and the trailing outboard portion 62.

The brake carrier 30 may include a plurality of abutments that may be adapted to support and retain brake pads. For example, the brake carrier 30 may include a first inboard abutment, referred to herein as leading brake pad abutment 70, at the leading inboard portion 50. The brake carrier 30 may further include a second inboard abutment, referred to herein as a trailing brake pad abutment 72, at the trailing inboard portion 60. The trailing brake pad abutment 72 may be disposed opposite the leading brake pad abutment 70 to receive a brake pad assembly (e.g., first brake pad assembly 22 of FIG. 1) between the leading brake pad abutment 70 and the trailing brake pad abutment 72.

The brake carrier 30 may further include a first outboard abutment, referred to herein as leading brake pad abutment 74, at the leading outboard portion 52. The brake carrier 30 may further include a second outboard abutment, referred to herein as a trailing brake pad abutment 76, at the trailing outboard portion 62. The trailing brake pad abutment 76 may be disposed opposite the leading brake pad abutment 74 to receive a brake pad assembly (e.g., second brake pad assembly 24 of FIG. 1) between the leading brake pad abutment 74 and the trailing brake pad abutment 76.

The abutments 70, 72, 74, 76 may be generally L-shaped abutments. In at least one approach, each abutment defines a generally horizontal surface and a generally vertical surface. The generally vertically surfaces may extend, for example, generally orthogonal to the generally horizontal surfaces. As used herein, terms such as "horizontal" and "vertical" are used with reference to the brake carrier orientation shown in the figures and are intended to convey relative orientation. It is expressly contemplated that the brake carrier 30 may be disposed in an orientation different than that shown in the figures.

The outboard abutments (leading brake pad abutment 74 and trailing brake pad abutment 76) may have a different configuration than the inboard abutments (leading brake pad abutment 70 and trailing brake pad abutment 72). For example, the leading brake pad abutment 74 and the trailing brake pad abutment 76 may each be provided with notches 78 at upper regions of the abutments.

In at least one example approach, the leading brake pad abutment 70 may include a leading horizontal surface 80 and a leading vertical surface 82, and the trailing brake pad abutment 72 may include a generally horizontal surface 84 and a generally vertical surface 86. Similarly, the leading brake pad abutment 74 may include a leading horizontal surface 88 and a leading vertical surface 90, and the trailing brake pad abutment 76 may include a trailing horizontal surface 92 and a trailing vertical surface 94.

The abutments 70, 72, 74, 76 may form receptacles adapted to receive brake pads or brake pad assembly. For example, the leading brake pad abutment 70 and the trailing brake pad abutment 72 may form a first receiving region 100 sized and adapted to receive a brake pad assembly (e.g., first brake pad assembly 22 of FIG. 1) between the leading brake pad abutment 70 and the trailing brake pad abutment 72. Similarly, the leading brake pad abutment 74 and the trailing brake pad abutment 76 may form a second receiving region 102 sized and adapted to receive a brake pad assembly (e.g., second brake pad assembly 24 of FIG. 1) between the leading brake pad abutment 74 and the trailing brake pad abutment 76.

In at least one approach, one or more surfaces of the abutments 70, 72, 74, 76 may be machined, and other surfaces may be unmachined. The different surface finishes may be expressed as having different surface roughness values.

An unmachined surface may be a surface that is formed during a casting process (e.g., a sand casting process). An unmachined surface may have a surface roughness value greater than 10 micrometers. For example, an unmachined surface may have a surface roughness value in the range of approximately 12 micrometers to approximately 25 micrometers.

A machined surface may be a surface that has undergone a machining process. The machining process may be any process that alters a surface dimension or surface finish. Example machine processes may include such as boring, broaching, drilling, electrical discharge machining, electrochemical machining, electron beam machining, milling, photochemical machining, planing, reaming, sawing, shaping, tapping, turning, and ultrasonic machining. A machined surface may have a surface roughness value less than or equal to 10 micrometers. For example, a machined surface may have a surface roughness value in the range of approximately 5 micrometers to approximately 7 micrometers.

Figure 3:
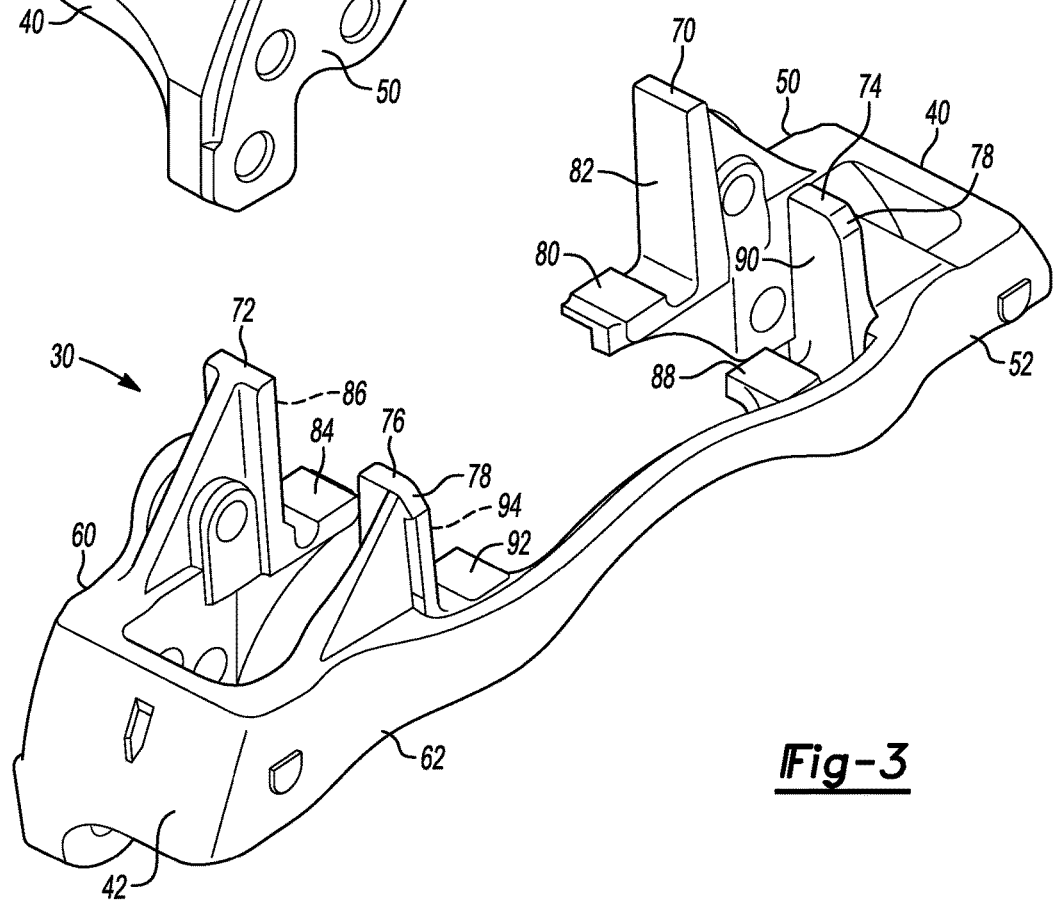
FIG. 3 is a rotated perspective view of the brake carrier of FIG. 2.

In this way, surfaces of the abutments 70, 72, 74, 76 may be provided with different surface finishes. In the approach shown in FIGS. 2 and 3, the vertical surfaces of the leading abutments may be machined surfaces, and the vertical surfaces of the trailing abutments may be unmachined surfaces. More particularly, the leading horizontal surface 80 of the leading brake pad abutment 70 may be a machined surface, and the leading vertical surface 82 may be an unmachined surface. Similarly, the leading horizontal surface 88 of the leading brake pad abutment 74 may be a machined surface, and the leading vertical surface 90 may be an unmachined surface. Trailing vertical surfaces 86, 94 and trailing horizontal surfaces 84, 92 of the trailing brake pad abutments 72, 76 may be machined surfaces.

Figure 4:
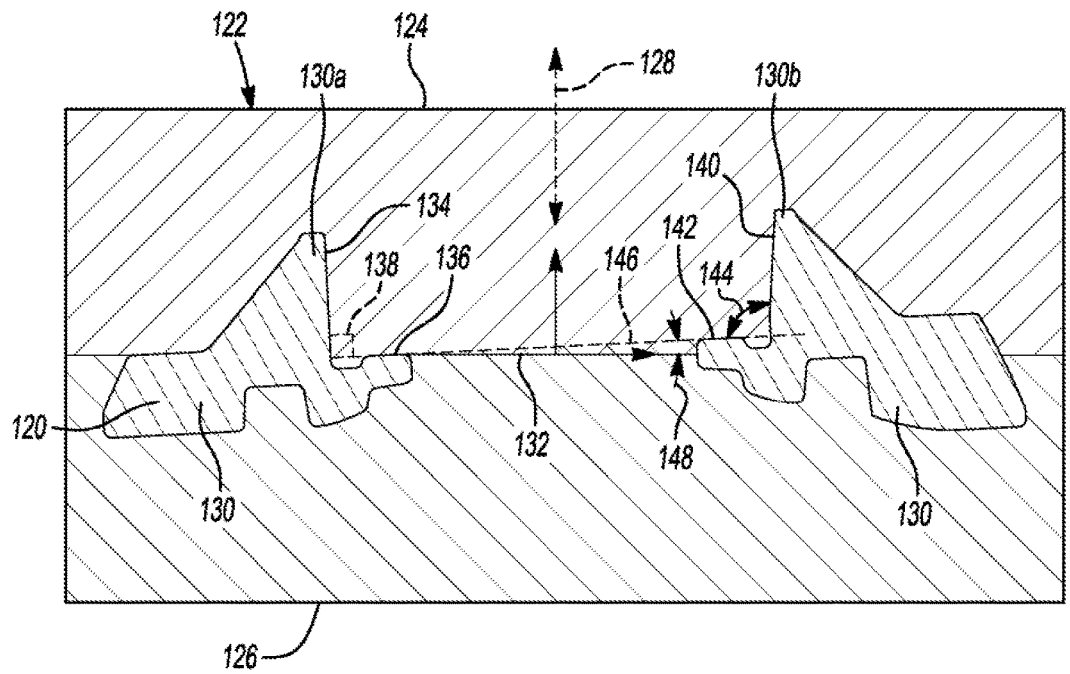
FIG. 4 is a cross-sectional view of a die assembly for casting the brake carrier.

Referring now to FIG. 4, a brake carrier 120 may be formed at a casting assembly 122. The casting assembly 122 may include a first die 124 and a second die 126. The first die 124 may be moveable with respect to the second die 126 along an axis 128. The first die 124 and the second die 126 may cooperate to define a cavity 130 when disposed against each other along a mating plane 132. The mating plane 132 may extend generally perpendicular to the axis 128. In the closed configuration, the first die 124 may engage the second die 126 continuously around the cavity 130 in the mating plane 132. The cavity 130 may have a plurality of regions, such as a leading brake pad abutment region 130a and a trailing brake pad abutment region 130b, Molten material may be introduced into the cavity to cast the brake carrier 120. The brake carrier 120 may have a leading wall surface 134 that may be at least partially disposed in the first die 124. The leading wall surface 134 may be disposed at an angle relative to the axis; for example, an angle of approximately 3 degrees.

The brake carrier 120 may also have a leading floor surface 136. In at least one approach, the leading floor surface 136 may be at least partially disposed in the first die 124. For example, the leading floor surface 136 may be completely disposed in the first die 124. The leading floor surface 136 may be disposed at an angle 138 substantially perpendicular to the leading wall surface 134. The leading floor surface 136 may be disposed in a nonparallel relationship with the mating plane 132.

The brake carrier 120 may also have a trailing wall surface 140 that may be at least partially disposed in the first die 124. The trailing wall surface 140 may be disposed at an angle relative to the axis; for example, an angle of approximately 3 degrees.

The brake carrier 120 may also have a trailing floor surface 142. In at least one approach, the trailing floor surface 142 may be at least partially disposed in the first die 124. For example, the trailing floor surface 142 may be completely disposed in the first die 124. The trailing floor surface 142 may be disposed at an obtuse angle 144 relative to the trailing wall surface 140. The obtuse angle 144 may be, for example, in the range of approximately 94 degrees to approximately 98 degrees, and more particularly, approximately 96 degrees. The trailing floor surface 142 may be coplanar with the leading floor surface 136; for example, within plane 146. The leading floor surface 136 and the trailing floor surface 142, in plane 146, may be disposed in a nonparallel relationship with the mating plane 132. For example, the leading floor surface 136 and the trailing floor surface 142 may extend in plane 146 at an angle 148 of approximately 3 degrees relative to the mating plane 132.

Figure 5:
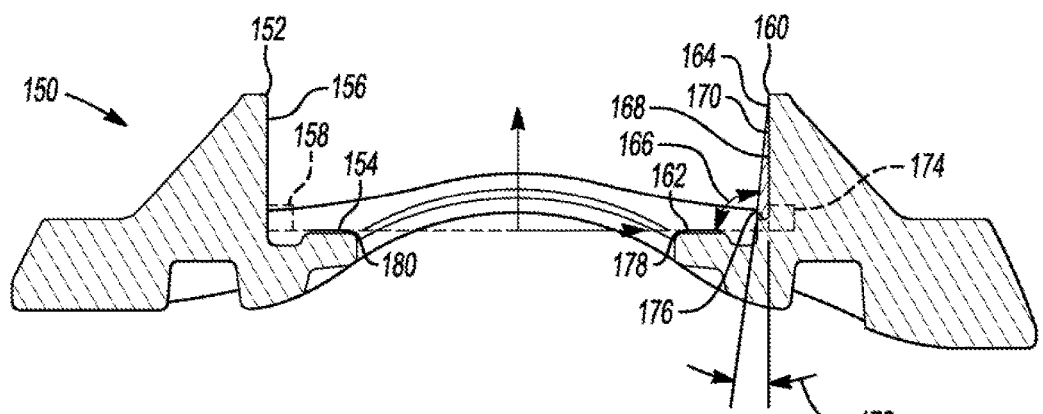
FIG. 5 is a cross section of the brake carrier along section line 5-5.

Referring now to FIG. 5, a brake carrier 150 formed by a casting assembly (such as the casting assembly 122 of FIG. 4) may be machined. The brake carrier 150 may include a first leading brake pad abutment 152 that may have an unmachined leading floor surface 154 and an unmachined leading wall surface 156. The unmachined leading wall surface 156 may be disposed at an angle 158 such that the unmachined leading wall surface 156 is generally perpendicular to the unmachined leading floor surface 154.

The brake carrier 150 may further include a first trailing brake pad abutment 160 that is spaced apart from the first leading brake pad abutment 152. The first trailing brake pad abutment 160 may include an unmachined trailing floor surface 162 and an unmachined trailing wall surface 164. The unmachined trailing wall surface 164 may extend at an obtuse angle 166 relative to the unmachined trailing floor surface 162. The unmachined trailing wall surface 164 may be disposed in a nonparallel relationship with the unmachined leading wall surface 156.

The unmachined leading vertical surface 156 and the unmachined trailing wall surface 164 may have a common surface roughness that may be, for example, greater than 10 micrometers.

In at least one approach, material 168 may be removed material from the unmachined trailing wall surface 164 to form a machined trailing wall surface 170. Material 168 may be removed such that the machined trailing wall surface 170 is angularly offset from the unmachined trailing wall surface 164. For example, material 168 may be removed such that the machined trailing wall surface 170 is angularly offset from the unmachined trailing wall surface 164 by an angle 172 of approximately 6 degrees.

The machined trailing wall surface 170 may be disposed at an angle 174 to the unmachined leading floor surface 162. For example, the machined trailing wall surface 170 may be disposed in a perpendicular relationship with the unmachined leading wall surface 162.

The machined trailing vertical surface 170 may have different surface roughnesses. For example, the machined trailing vertical surface 170 may have a surface roughness less than or equal to 10 micrometers. In this way, the machined trailing vertical surface 170 may have a surface roughness less than the unmachined leading vertical surface 156.

Furthermore, whereas the unmachined leading wall surface 156 and the unmachined trailing wall surface 164 may have been disposed in a nonparallel relationship, the machined trailing wall surface 170 may be disposed in a parallel relationship with the unmachined leading wall surface 156.

In at least one approach, in addition to forming the machined trailing wall surface 170, removing material 168 from the unmachined trailing wall surface 164 forms a ledge surface 176 that extends from the machined trailing wall surface 170 toward the first leading brake pad abutment 152. The ledge surface 176 may be disposed above and substantially parallel to the unmachined trailing floor surface 162.

The machining of the brake carrier 150 may include not removing material from the unmachined leading wall surface 156 so that the unmachined leading wall surface 156 remains as-cast.

In at least one approach, the machining of the brake carrier 150 may further include not removing material from the unmachined trailing floor surface 162 so that the unmachined trailing floor surface 162 remains as-cast. In still another approach, the machining of the brake carrier 150 may further include removing material from the unmachined trailing floor surface 154 to form a machined trailing floor surface 178.

In at least one approach, the machining of the brake carrier 150 may also include not removing material from the unmachined leading floor surface 154 so that the unmachined leading floor surface 154 remains as-cast. In still another approach, the machining of the brake carrier 150 may include removing material from the unmachined leading floor surface 154 to form a machined leading floor surface 178.

In at least one approach, one or more unmachined surfaces may define a datum feature and thus, may be utilized as a datum reference during the machining of one or more surfaces of the brake carrier 120. For example, unmachined leading floor surface 154 and unmachined leading wall surface 156 may be utilized as datum references during the machining of one or more of the trailing floor surface 162 and the trailing wall surface 164. More particularly, when the brake carrier 120 is disposed in a machining fixture or framework, one or more locations on the unmachined leading floor surface 154 and unmachined leading wall surface 156 may serve as datum references for a machine head. As used herein, a "datum" may refer to a point, axis, or plane of the brake carrier 120. In this way, a datum may be a selected base from which other features or points are located at the brake carrier 120. That is, a datum may serve as the origin from which the location or geometric characteristics of features of the brake carrier 120 are established. Locating datum references on "as cast" surfaces may allow for the machining of other surfaces within a given tolerance.

In this way, the method for forming the brake carrier may include disposing the brake carrier proximal a machining assembly. The method may further include engaging the unmachined leading wall surface with a fixture portion of the machining assembly. When fixture portion is in engagement with the unmachined leading wall surface, the method may further include removing material from at least one of the unmachined trailing wall surface (e.g., to form the machined trailing wall surface) and the unmachined trailing floor surface (e.g., to form the machined trailing floor surface).

In at least another approach, the method may include engaging an unmachined leading floor surface with a fixture portion of the machining assembly. When fixture portion is in engagement with the unmachined leading floor surface, the method may further include removing material from at least one of the unmachined trailing wall surface (e.g., to form the machined trailing wall surface) and the unmachined trailing floor surface (e.g., to form the machined trailing floor surface).

The first leading brake pad abutment 152, including the unmachined leading vertical surface 156 and the leading floor surfaces 154 or 180, and the first trailing brake pad abutment 160, including the machined trailing wall surface 170 and the trailing floor surfaces 162 or 178, may cooperate to define a first opening for receiving a first brake pad, such as brake pad assembly 24 shown in FIG. 1.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A method of making a brake carrier comprising:
providing a casting assembly including a first die and a second die that cooperate to define a cavity when disposed against each other along a mating plane; and
introducing molten material into the cavity to cast the brake carrier, wherein the brake carrier has a leading wall surface that is at least partially disposed in the first die and a leading floor surface that is disposed substantially perpendicular to the leading wall surface and is disposed in a nonparallel relationship with the mating plane, and a trailing wall surface that is at least partially disposed in the first die and a trailing floor surface that is disposed at an obtuse angle relative to the trailing wall surface, wherein the trailing floor surface is coplanar with the leading floor surface and is disposed in a nonparallel relationship with the mating plane.

2. The method of claim 1 wherein the leading floor surface is at least partially disposed in the first die.

3. The method of claim 1 wherein the leading floor surface is completely disposed in the first die.

4. The method of claim 1 wherein the trailing floor surface is at least partially disposed in the first die.

5. The method of claim 1 wherein the trailing floor surface is completely disposed in the first die.

6. The method of claim 1 wherein the first die is moveable with respect to the second die along an axis that is disposed perpendicular to the mating plane.

7. The method of claim 1 wherein the first die engages the second die continuously around the cavity in the mating plane.

8. The method of claim 1 wherein the leading floor surface is an unmachined leading floor surface and the leading wall surface is an unmachined leading wall surface, wherein the trailing floor surface is an unmachined trailing floor surface and the trailing wall surface is an unmachined trailing wall surface, wherein the brake carrier includes a first leading brake pad abutment that includes the unmachined leading floor surface and the unmachined leading wall surface, and a first trailing brake pad abutment that is spaced apart from the first leading brake pad abutment and that includes the unmachined trailing floor surface and the unmachined trailing wall surface, the method further including:
removing material from the unmachined trailing wall surface to form a machined trailing wall surface, and not removing material from the unmachined leading wall surface so that the unmachined leading wall surface remains as-cast.

9. The method of claim 8 further comprising not removing material from the unmachined leading floor surface so that the unmachined leading floor surface remains as-cast.

10. The method of claim 8 further comprising removing material from the unmachined trailing floor surface to form a machined trailing floor surface.

11. The method of claim 10 wherein the machined trailing wall surface is disposed perpendicular to the machined trailing floor surface and the unmachined leading floor surface is disposed in a perpendicular relationship with the unmachined leading wall surface.

12. The method of claim 8 wherein the unmachined leading wall surface is disposed in a nonparallel relationship with the unmachined trailing wall surface and the unmachined leading wall surface is disposed in a parallel relationship with the machined trailing wall surface.

13. The method of claim 8 wherein removing material from the unmachined trailing wall surface forms the machined trailing wall surface and a ledge surface that extends from the machined trailing wall surface toward the first leading brake pad abutment.

14. The method of claim 13 wherein the ledge surface is disposed above and substantially parallel to the trailing floor surface.

15. The method of claim 8 wherein the unmachined leading vertical surface has a surface roughness greater than 10 micrometers and the machined trailing vertical surface has a surface roughness less than or equal to 10 micrometers.

16. The method of claim 8 wherein the first leading brake pad abutment and the first trailing brake pad abutment cooperate to define a first opening for receiving a first brake pad.

17. The method of claim 8 wherein at least one of the unmachined leading wall surface and the unmachined leading floor surface defines a datum feature, the method further comprising:
disposing the brake carrier proximal a machining assembly;
engaging at least one of the unmachined leading wall surface and the unmachined leading floor surface with a fixture portion of the machining assembly; and
when fixture portion is in engagement with at least one of the unmachined leading wall surface and the unmachined leading floor surface, removing material from the unmachined trailing wall surface to form the machined trailing wall surface.

* * * * *